United States Patent [19]

Breckenfelder

[11] 3,905,246
[45] Sept. 16, 1975

[54] CONSTRUCTION AND METHOD FOR FORMING A PLUNGER SEAL

[75] Inventor: Alvin Herman Breckenfelder, Hoffman Estates, Ill.

[73] Assignee: Illinois Tool Works Inc., Chicago, Ill.

[22] Filed: June 5, 1974

[21] Appl. No.: 476,487

[52] U.S. Cl............. 74/18.2; 277/189; 277/212 FB
[51] Int. Cl.²................... F16D 3/84; F16J 15/56
[58] Field of Search.................. 74/18.2, 18, 18.1; 64/15 R, 22, 32 F; 188/322; 277/166, 189, 212 FB

[56] References Cited
UNITED STATES PATENTS

| | | | |
|---|---|---|---|
| 278,597 | 5/1883 | Prier et al. | 74/18.2 |
| 1,289,434 | 12/1918 | Fulton | 74/18.2 |
| 1,507,567 | 9/1924 | Aschenbach | 277/189 |
| 1,624,852 | 4/1927 | Trautner | 277/189 |
| 2,305,265 | 12/1942 | Tourneau | 277/212 FB |
| 2,687,015 | 8/1954 | Edwards | 74/18.2 |
| 3,178,191 | 4/1965 | Dodd et al. | 277/189 |
| 3,748,913 | 7/1973 | Quiney | 74/18.2 |

*Primary Examiner*—Samuel Scott
*Assistant Examiner*—Allan R. Burke
*Attorney, Agent, or Firm*—Robert W. Beart; Glenn W. Bowen

[57] ABSTRACT

A seal for a plunger of a switch or the like is provided by a thin flexible membrane, the outer periphery of which extends into a recessed groove in the housing through which the plunger passes. The center of the membrane is provided with a central aperture which receives the plunger. The membrane forms a tight seal with the plunger and a reduced diameter groove in the plunger. A spring washer is placed over the top of the membrane and is forced into the recessed groove so that the outer periphery of the washer is secured in the groove to form a seal for the housing.

2 Claims, 2 Drawing Figures

PATENTED SEP 16 1975 3,905,246

CONSTRUCTION AND METHOD FOR FORMING A PLUNGER SEAL

BACKGROUND OF THE INVENTION

In various devices in which a plunger passes through a housing, it is necessary to seal the opening for the plunger against moisture to protect components in the housing. Electrical switches actuated by a plunger are one example of such a device. It is current practice to provide a recessed groove around the plunger, and to provide a seal between the plunger and the housing by means of a flexible membrane which has a center aperture that fits over the plunger so that a compression seal is formed between the membrane and the plunger. The outer periphery of the membrane is then secured into the groove with an adhesive. A satisfactory seal may be provided in this manner, but with this type of sealing further processing of the device must be delayed until the adhesive dries; and in addition, the application of adhesive to the membrane is a relatively expensive procedure. By contrast, the present invention provides a much less expensive manner of assemblying a plunger seal; and in addition, eliminates the necessity of waiting for the adhesive to dry since an immediate securing of the membrane on the plunger seal is achieved.

It is, therefore, the object of the present invention to provide an improved plunger seal construction and method of forming the same for a device having a housing, a plunger which passes through an aperture in the housing, a recessed groove in the housing around the plunger and a thin flexible membrane having an outer periphery which extends into the recessed groove and a central aperture which fits over the plunger to form a compression seal, wherein an improved seal is formed by a spring washer that is placed over the top of the membrane and wedged into the recessed groove so as to secure the outer periphery of the membrane in place in the recessed groove.

DESCRIPTION OF THE DRAWINGS

The present invention is shown and described by reference to the following drawings in which.

TECHNICAL DESCRIPTION OF THE INVENTION

Figure 1:
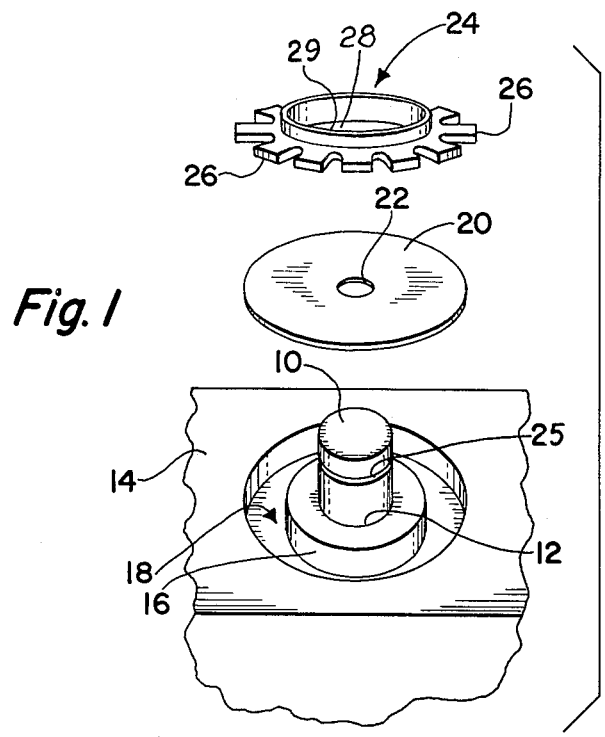
FIG. 1 is an exploded view of the plunger seal of the present invention.
Figure 2:
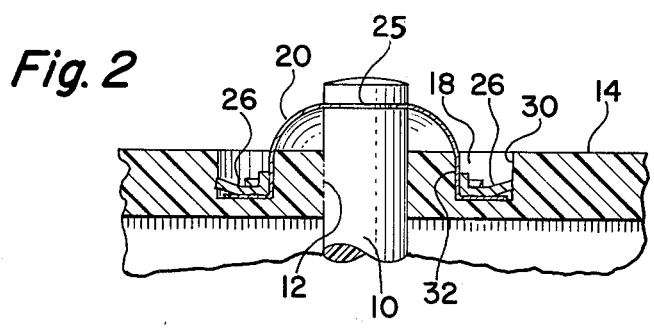
FIG. 2 is a side cross-sectional view of the plunger seal of FIG. 1.

The present invention relates to a plunger seal which is illustrated in FIGS. 1 and 2. The seal is applicable to devices having a plunger which passes through an aperture in a housing that houses internal parts that must be sealed. The seal is especially useful for electrical switches which have internal components that must be protected from moisture.

The plunger shaft 10, which is shown in FIG. 1, extends through an aperture 12 in the housing 14. The aperture 12 is formed in a boss 16 which is surrounded by a recessed groove 18 in the housing 14. The seal for the assembly is formed of a flexible thin membrane 20 which may be constructed of a suitable flexible material such as rubber. The membrane 20 has a central aperture 22 that fits over the upper end of the plunger 10 and snaps into place on the recessed groove 24 near the top of the plunger 10 so as to form a compression seal between the membrane 20 and the plunger 10.

The outer periphery of the membrane 20 is then secured into place in the recessed groove 18 by means of a spring-tempered thin spring washer 24 which is forced in the groove 18. The spring washer 24 preferably has a number of external teeth 26 and a relatively large central aperture 28. The aperture 28 is preferably large enough to fit over the boss 16. The length of the teeth 26 are slightly longer than the width of the groove 18, so that when the spring washer 24 is inserted over the plunger 10 and is forced into the groove 18, the teeth 26 will be deflected, as depicted in FIG. 2, with the outer portion of the teeth 26 being wedged against the outer wall 30 of the groove 18. The rim 29 of the washer 24 will secure the membrane 20 tightly against the inner wall 32 of the groove 18. Although a plurality of the teeth 26 extending around the entire periphery of the washer 24 is preferred, the sealing member could be made with any combination of two or more teeth extending around the periphery of the washer. The seal provided in this manner is immediately effective and is provided a relatively low cost.

It is apparent that various modifications may be made without departing from the scope of the following claims.

The invention is claimed as follows:

1. In a plunger seal for a device comprising a housing with an aperture therein, a vertically movable plunger which passes through said aperture, a recessed circular groove formed in said housing around said plunger having substantially vertical inner and outer walls and a substantially horizontal base and a thin flexible circular membrane having a central aperture which forms a compression seal with said plunger and an outer periphery which extends into said groove so that said thin flexible membrane engages said inner wall and at least a portion of said base, the improvement comprising a securing member having a plurality of external teeth and a vertically, circular extending rim wherein said teeth of said securing member are wedged into said outer wall of said groove so as to compress said membrane between said teeth and said base and between said rim and said inner wall of said groove.

2. The improvement claimed in claim 1 wherein said securing member is an external tooth, spring-tempered lock washer.

* * * * *